United States Patent [19]

Curic

[11] Patent Number: 5,672,105
[45] Date of Patent: Sep. 30, 1997

[54] COMPUTER VIDEO MONITOR MASK

[76] Inventor: Chris Curic, 759 Woburn Woods Ln., Mississauga, Ontario, Canada, L5C 4N1

[21] Appl. No.: 583,894

[22] Filed: Jan. 11, 1996

[51] Int. Cl.[6] .................... B41L 3/00; B42D 17/00; B41J 11/02
[52] U.S. Cl. .................... 462/72; 462/71; 281/44; 281/45; 40/358; 40/594; 248/442.2; 248/918
[58] Field of Search .................... 462/71, 72; 281/3.1, 281/44, 45, 51; 40/594, 358; 248/918, 442.2

[56] References Cited

U.S. PATENT DOCUMENTS

| | | | |
|---|---|---|---|
| D. 142,670 | 10/1945 | Rogow | D6/2 |
| 1,499,145 | 3/1924 | Clarkson . | |
| 3,826,519 | 7/1974 | Gavin et al. | 281/44 |
| 4,632,471 | 12/1986 | Visnapuu | 312/233 |
| 4,822,074 | 4/1989 | Hueffman et al. | 462/72 X |
| 4,858,955 | 8/1989 | Holt | 281/45 |
| 4,869,565 | 9/1989 | Bachman | 312/234 |
| 5,038,505 | 8/1991 | Young | 40/358 |
| 5,098,128 | 3/1992 | Husta | 281/45 |
| 5,104,087 | 4/1992 | Wentzloff et al. | 248/442.2 |
| 5,328,145 | 7/1994 | Charapich | 248/442.2 |
| 5,398,905 | 3/1995 | Hinson | 248/442.2 |
| 5,543,190 | 8/1996 | Johnson et al. | 462/72 X |
| 5,549,267 | 8/1996 | Armbruster et al. | 248/918 X |

FOREIGN PATENT DOCUMENTS

| | | | |
|---|---|---|---|
| 365 712 | 5/1990 | European Pat. Off. | 281/45 |
| 684765 | 3/1930 | France | 40/594 |
| 964413 | 1/1950 | France | 281/45 |
| 32 32 529 | 3/1983 | Germany | 281/45 |
| 2 128 137 | 4/1984 | United Kingdom | 281/51 |

*Primary Examiner*—Daniel W. Howell
*Assistant Examiner*—Julie A. Krolikowski
*Attorney, Agent, or Firm*—Donald E. Hewson

[57] ABSTRACT

A computer video monitor mask for removable attachment to a computer video monitor having a computer video monitor screen and a front face, comprises a generally planar substantially rigid panel portion having a generally planar front surface, a back surface, a top edge, a bottom edge, and first and second opposed side edges. The computer video monitor mask is attached to the front face of the computer video monitor by way of a hook and loop fastener system such as VELCRO™. A first generally centrally disposed cut-away portion in the back panel is shaped and dimensioned to permit viewing of the computer video monitor screen therethrough when the computer video monitor mask is in place on the computer video monitor. There is optionally provided a removable paper writing surface generally surrounding the computer video monitor screen, wherein a plurality of sheets of paper are secured together in overlying separable relation one over another so as to form at least one pad of paper. The pad of paper is operatively attached to the front surface of the panel portion by way of a low tack adhesive, a spine made from binding material, or by staples, so as to be disposed substantially between any of the top, bottom and side edges and the first generally centrally disposed opening. Optionally, the page elements only display information and are movable between a front surface display position and a back surface display position.

8 Claims, 7 Drawing Sheets

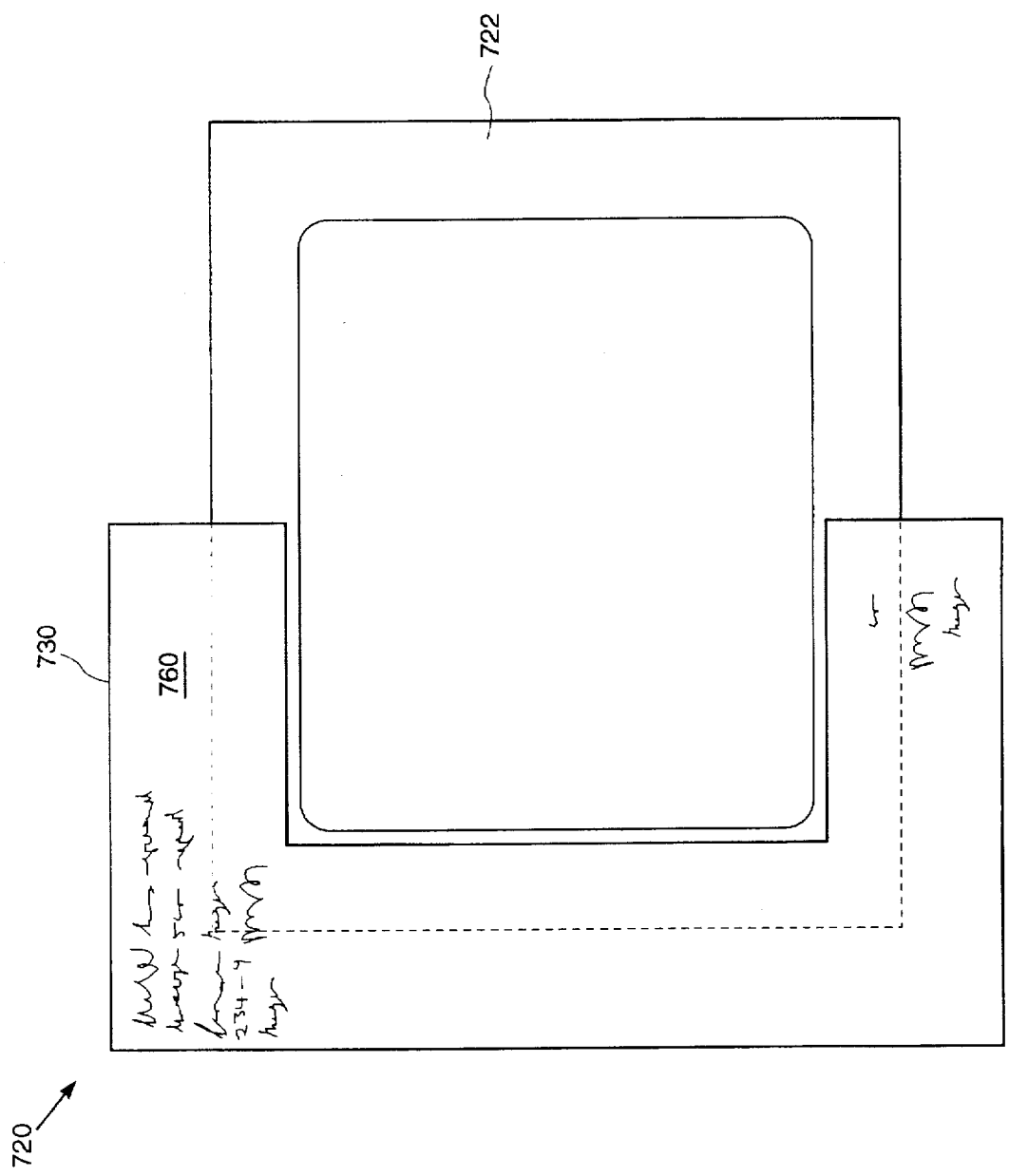

COMPUTER VIDEO MONITOR MASK

FIELD OF THE INVENTION

This invention relates to computer video monitors and more particularly to computer video monitor masks for removable attachment to a computer video monitor.

BACKGROUND OF THE INVENTION

Computers are an essential tool for many people in business and at home. Indeed, many computer users spend most of a work day, if not the entire work day, in front of a computer video monitor. Often, space at a computer video monitor is very limited. Many situations that involve sitting in front of a computer video monitor all day include provision of a work-space that accommodates the computer video monitor and keyboard and associated other parts of the computer, and also room for the operator, but which provides very little other space. Further, home work spaces are often relatively small and have little room for recording information and displaying information. In any event, space around a computer video monitor often is at a premium.

Further, it has been found that, in working at a computer video monitor, it is very useful, if not necessary, to have certain pre-set information readily available, where it can be easily seen, for quick reference. Such pre-set information includes various indicia as known telephone numbers, computer commands, calendars, reminder notes, and so on. Typically, such preset information could be needed at any time by a person using a computer video monitor, and therefore should be displayed on an ongoing basis. It is also very useful, if not imperative, to be able to jot down information such as new telephone numbers, notes, reminders and so on, while working at a computer video monitor. Such information is short term information that is recorded on an on-going basis and may possibly be saved for a few days, or even longer, or perhaps immediately used and discarded, or immediately passed on to another person in the form of a paper note of some sort.

It is often difficult, especially in limited work-spaces, to use the area around a computer video monitor to record information or to allocate the area around a computer video monitor for placement of information for viewing. It has been found that it may be more convenient and more useful to be able to access information and to physically record information on the computer video monitor structure itself, by writing on POST-IT NOTES™, and placing the POST-IT NOTES™ on the front face of the computer video monitor, around the screen. However, the placing of POST-IT NOTES™ on a computer video monitor is generally undesirable, as it is unsightly, there is very little room, and the POST-IT NOTES™ can easily become lost.

In any event, it would often be preferable to be able to free-up work space for purposes other than recording notes, if work space is limited.

One other important consideration is that of being able to record information onto a sheet of paper, such as a pre-designed form or the like, for permanent inclusion in a physical file. In this case, it is often necessary, or at least preferable, that the paper be of substantial size, such as 8½"×11", or nearly so, in order to have enough room to record the necessary information, and also to conform to and be readily storable in standard record keeping systems, such as binders and the like.

It is an object of the present invention to provide a means by which pre-set information, such as calendars, computer commands, telephone numbers, and so on can be diplayed in a location adjacent or surrounding a computer monitor where it can be easily seen.

It is another object of the present invention to provide a means by which information can be quickly recorded by hand, possibly a great deal of information—more than would typically fit on a POST-IT NOTE™, small notepad, or the like.

It is a further object of the present invention to provide a means by which old information can be readily removed and new information can be readily recorded.

It is yet another object of the present invention to provide a means by which pre-designed forms and the like can be displayed at a computer video monitor, and can be conveniently written on.

DESCRIPTION OF THE PRIOR ART

U.S. Pat. No. 4,869,565 to BACHMAN discloses a universally adjustable display apparatus for fitment about and affixation to a computer video monitor for provision of indicia-bearing surfaces substantially parallel to the front surface of the monitor. The display apparatus consists of two "L"-shaped display members with variable attachment means. The attachment means permit overlapping attachment of the two display members while enabling the display apparatus to be horizontally expanded and contracted to any width of computer video monitor. This patent only contemplates that the front surface of the display apparatus may be cork or may hold accessories thereon by means such as a clip.

U.S. Pat. No. 5,104,087 to WENTZLOFF et al discloses a note/memo board for computers, and is directed to the structure that permits attachment to a computer video monitor. This patent contemplates that the front face of the note/memo board is either a cork board or rubber material for receiving pins therein, a writing surface, a chalk board, or a write-on/wipe-off surface, and further states that the use of POST-IT NOTES™ on computer video monitors could be eliminated through the use of the note/memo board disclosed in this patent.

U.S. Pat. No. 5,328,145 to CHARAPICH discloses a mounting board for computer video monitors wherein a large planar sheet has an opening for viewing the computer video monitor screen therethrough. The mounting board is attached to the front of the computer video monitor by means such as VELCRO™, and is made from cardboard, plastic, or suitable foam. The front surface is preferably erasable and it is contemplated in the patent that the front of the mounting board can be configured in many ways and can have many different things mounted thereon. This patent only contemplates that a sheet of paper can be attached to the mounting board. It does not contemplate that the mounting board can include a pad of paper.

U.S. Pat. No. 5,398,905 to HINSON discloses a die-cut display board for a computer video monitor wherein a cardboard, plastic, or foam back is secured with double sided tape or VELCRO™ to a computer video monitor. A generally central opening permits viewing of the computer video monitor screen. A small note holder and a pencil holder are optional. It appears that the main purpose of this display board is ornamental.

U.S. Pat. No. 4,632,471 to VISNAPUU discloses a computer video work station with a copy holder, wherein a frame of the copyholder is securely mounted in adjustable relation to a computer video monitor by means of large support brackets. The copy holder has a copy holding panel extending outwardly to the side of the computer monitor. The copy holding panel is configured to have copy material to be clipped thereonto.

SUMMARY OF THE INVENTION

In accordance with one aspect of the present invention, there is provided a computer video monitor mask for removable attachment to a computer video monitor having a computer video monitor screen and a front face. The computer video monitor mask provides a removable paper writing surface generally surrounding the computer video monitor screen and comprises a generally planar substantially rigid panel portion having a generally planar front surface, a back surface, a top edge, a bottom edge, and first and second opposed side edges. Attachment means are used to attach the computer video monitor mask to the computer video monitor. A first generally centrally disposed opening in the panel portion is shaped and dimensioned to permit viewing of the computer video monitor screen therethrough when the computer video monitor mask is in place on the computer video monitor. A plurality of sheets of paper are secured together in overlying separable relation one over another by a securing means disposed at only a minor portion of each of the sheets so as to form at least one pad of paper with one of the sheets of paper presenting the paper writing surface, the at least one pad of paper being operatively attached to the front surface of the panel portion so as to be disposed substantially between any of the top, bottom and side edges and the first generally centrally disposed opening.

In accordance with another aspect of the present invention, there is provided a computer video monitor mask for removable attachment to a computer video monitor having a computer video monitor screen and a front face. The computer video monitor mask generally surrounds the computer video monitor screen, and comprises a generally planar substantially rigid back panel having a generally planar front surface, a back surface, a top edge, a bottom edge, a first side edge, a second side edge, and a cut-away portion therein. An Attachment means are disposed on the back panel to attach the computer video monitor mask to the computer video monitor. The back panel is shaped and dimensioned to at least partially surround the computer video monitor screen. The cut-away portion of the back panel is shaped and dimensioned to permit viewing of the computer video monitor screen therethrough, when the computer video monitor mask is in place on the computer video monitor. A binding means securely attached to the back panel. A plurality of page elements each having a front surface, a back surface, a top edge, a bottom edge, a first side edge, a second side edge, and a cut-away portion therein, are operatively connected to the back panel by the binding means, for movement of each page element individually between a front surface display position whereat the front surface of the page element faces outwardly so as to be visible from in front of the computer video monitor screen, and a back surface display position whereat the back surface of the page element faces outwardly so as to be visible from in front of the computer video monitor screen. The plurality of page elements are each shaped and dimensioned to at least partially surround the computer video monitor screen, and the cut-away portions of each of the plurality of page elements are shaped and dimensioned to permit viewing of the computer video monitor screen therethrough, when the computer video monitor mask is in place on the computer video monitor, and when the page elements are in either of the front surface display position and the back surface display position.

BRIEF DESCRIPTION OF THE DRAWINGS

Embodiments of this invention will now be described by way of example in association with the accompanying drawings in which:

FIG. 7 is a front elevational view of yet a further alternative embodiment of the computer video monitor mask of FIG. 1;

DETAILED DESCRIPTION OF THE PREFERRED EMBODIMENTS

Figure 1:
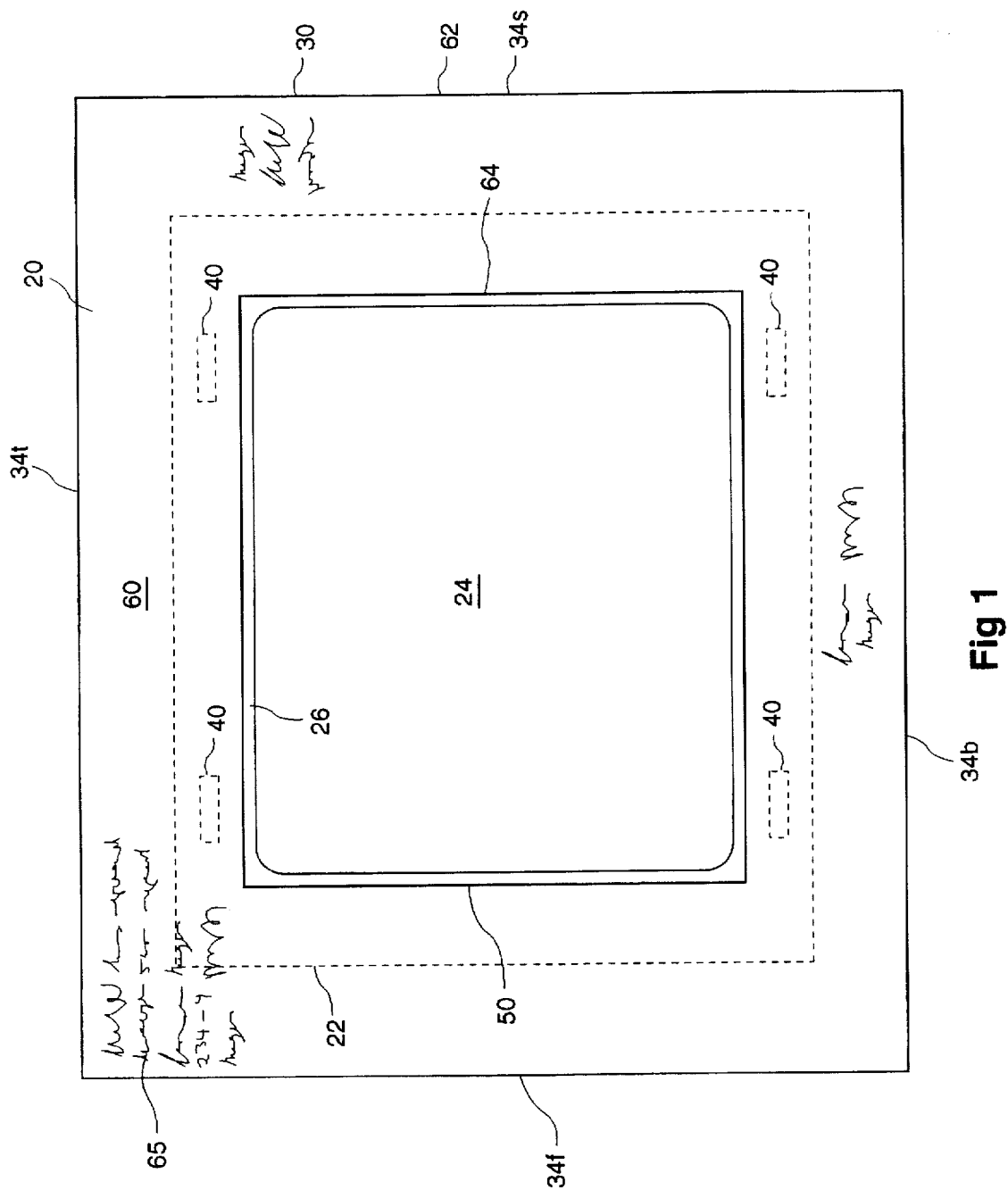
FIG. 1 is a front elevational view of a first preferred embodiment of the computer video monitor mask of the present invention in place on a computer video monitor.
Figure 2:
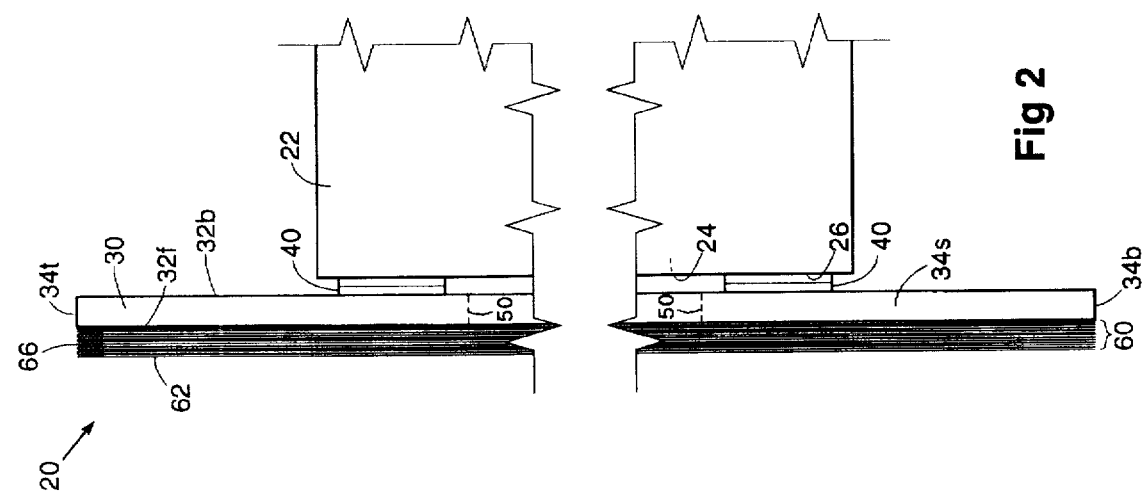
FIG. 2 is a side elevational view of the computer video monitor mask of FIG. 1.

Reference will now be made to FIGS. 1 and 2, which show a first preferred embodiment of the computer video monitor mask 20 of the present invention. The computer video monitor mask 20 is for removable attachment to a computer video monitor 22 having a computer video monitor screen 24, and a front face 26 surrounding the computer video monitor screen 24. Various embodiments of the video monitor mask 20 are contemplated. In one preferred embodiment, the computer video monitor mask 20 provides a removable paper writing surface generally surrounding the computer video monitor screen 24.

The computer video monitor mask 20 comprises a generally planar substantially rigid back panel 30, which is preferably made from cardboard or pressboard, but can also be made from other suitable materials. The generally planar substantially rigid back panel 30 has a generally planar front surface 32f, a back surface 32b, a top edge 34t, a bottom edge 34b, and first and second opposed side edges 34f, 34s.

In the preferred embodiment, the back panel 30 extends substantially all of the way around the computer video monitor screen 24, and is substantially unbroken so as to form a complete and strong support surface around the computer video monitor screen 24. Alternatively, as is shown in FIG. 7, the rigid panel portion 730 and the sheets of paper 760 of the computer video monitor mask 720 could extend only part of the way around a computer video monitor 722, if desired.

The computer video monitor mask 20 of the present invention is removably attachable to the front face 26 of the computer video monitor 22 by way of attachment means 40. In the preferred embodiment, the attachment means 40 comprises a hook and loop type fastening system, such as VELCRO™, with one component of the hook and loop type fastening system being secured by way of suitable adhesive to the back surface 32b of the substantially rigid back panel 30 and the other component of the hook and loop type fastening system being secured by means of suitable adhesive to the front face 26 of the computer video monitor 22. In this manner, the computer video monitor mask 20 of the present invention can be removably attached to the front face 26 of the computer video monitor 22.

A first cut-away portion 50 is generally centrally disposed within the generally planar substantially rigid back panel 30. The first generally centrally disposed cut-away portion 50 is shaped and dimensioned to permit viewing of the computer video monitor screen 24 therethrough when the computer video monitor mask 20 is in place on the computer video monitor 22, attached to the front face 26 thereof, so as to not interfere with the use of the computer video monitor 22. The attachment means 40, such as the component of the hook and loop fastening system on the front face 26 of the computer video monitor 22, must be placed correctly so as to ensure that the first generally centrally disposed cut-away portion 50 is disposed in proper alignment with the computer video monitor screen 24.

A plurality of sheets of paper 60—perhaps anywhere from twenty sheets to one hundred sheets, with the exact number being unimportant—is secured together in overlying separable relation one over the other so as to form a pad of paper 62. In the preferred embodiment, there is only one single pad of paper 62, which single pad of paper 62 surrounds the first generally centrally disposed opening 50 in the back panel 30. Alternatively, there may be two or more pads of paper, if desired. Each of the sheets of the paper 60 in the pad of paper 62 is continuous around the first generally centrally disposed opening 50 in the back panel 30. Further, each of the sheets of paper 60 has a second generally centrally disposed opening 64 therein, with the second generally centrally disposed opening 64 in each of the sheets of paper 60 being aligned one with the other. Further, the first generally centrally disposed opening 50 in the back panel 30 and the second generally centrally disposed openings 64 in the sheets of paper 60 are in substantial alignment one with another.

Preferably, the sheets of paper 60 in the pad of paper 62 are substantially the same size as the back panel 30. The back panel 30 may, however, extend beyond the boundary of the sheets of paper 60 for reasons such as to provide a surface for displaying pre-set information, including indicia, such as a calendars, and so on.

In the preferred embodiment, the sheets of paper 60 are secured together in overlying separable relation one over another to form the pad of paper 62 by means of a low tack adhesive 66, such as those used on POST-IT NOTES™. Further, it is important that the plurality of sheets of paper are secured together by a securing means as a low tack adhesive, staples, and so on, at a minor portion of each of the sheets of paper only, as can be readily seen in FIG. 2, where the low tack adhesive 66 is shown at the top portion of the sheets of paper 60 only. In this manner, the top sheet of the plurality of sheets of paper 60 is readily removable from the underlying sheets of paper 60, when the top sheet is no longer needed on the pad of paper 62.

Further, the pad of paper 62 is secured to the front surface 32f of the back panel 30 by means of the same low tack adhesive 66 as is used to secure together the plurality of sheets of paper 60, one to another.

The pad of paper 62 is operatively attached to the front surface 32f of the back panel 30 so as to be disposed substantially between any of the top 34t, bottom 34b, and first and second side edges 34f, 34s, and the first generally centrally disposed opening 50. In this manner, the generally planar substantially rigid back panel 30 supports the entire pad of paper 62.

Pre-set information, including indicia 65, such as calendars and so on, may be printed onto the sheets of paper 60, as desired.

Figure 3:
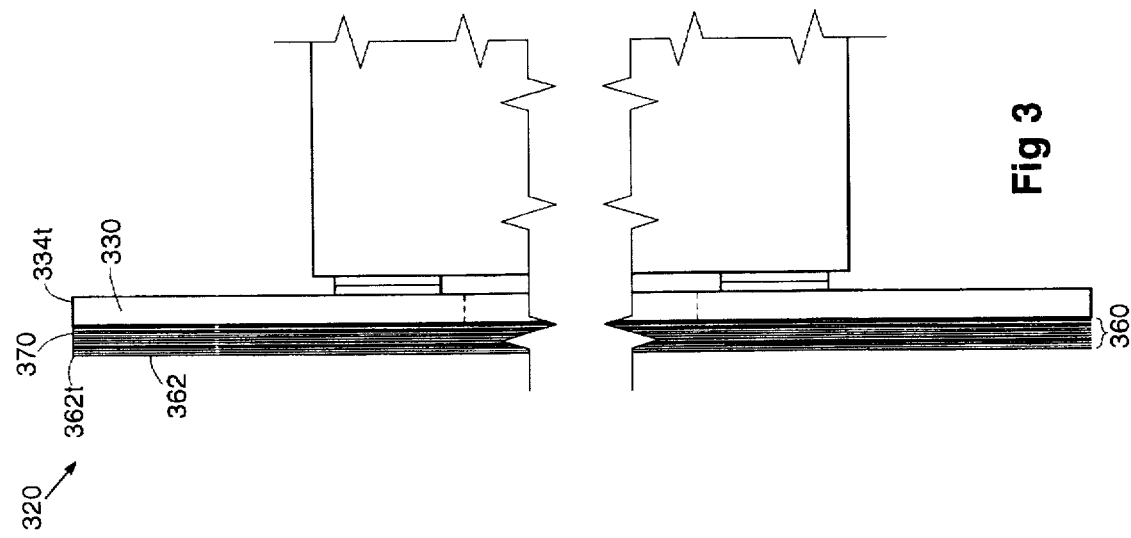
FIG. 3 is a side elevational view of an alternative embodiment of the computer video monitor mask of FIG. 1.

In one alternative embodiment of the first preferred embodiment, as illustrated in FIG. 3, it is contemplated that the computer video monitor mask 320 comprises a panel portion 330 and a plurality of sheets of paper 360. The sheets of paper 360 are secured one to another to form a pad of paper 362, and the pad of paper 362 is secured to the panel portion 330 by means of a spine 370 made from binding material disposed along the top edge 362t of the sheets of paper 360 and disposed along the top edge 334t of the panel portion 330. In this manner, the sheets of paper 360 are secured together in overlying separable relation one over another.

Figure 4:
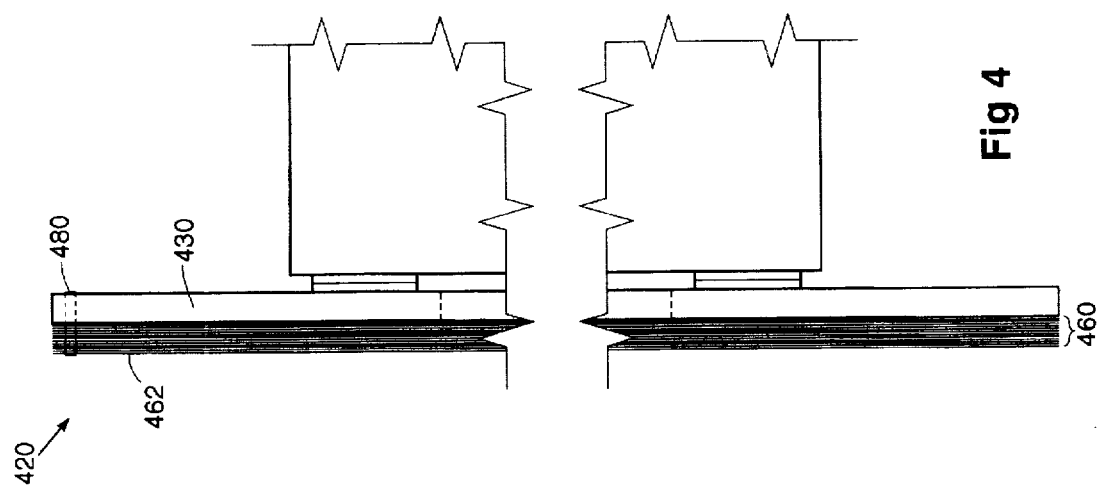
FIG. 4 is a side elevational view of a further alternative embodiment of the computer video monitor mask of FIG. 1.

In a second alternative embodiment of the first preferred embodiment, as illustrated in FIG. 4, it is contemplated that the computer video monitor mask 420 comprises a panel portion 430 and a plurality of sheets of paper 460. The sheets of paper 460 are secured one to another to form a pad of paper 462, and the pad of paper 462 is secured to the panel portion 430 by means of at least one staple, preferably a plurality of staples 480. In this manner, the sheets of paper 460 are secured together in overlying separable relation one over another.

Figure 5:
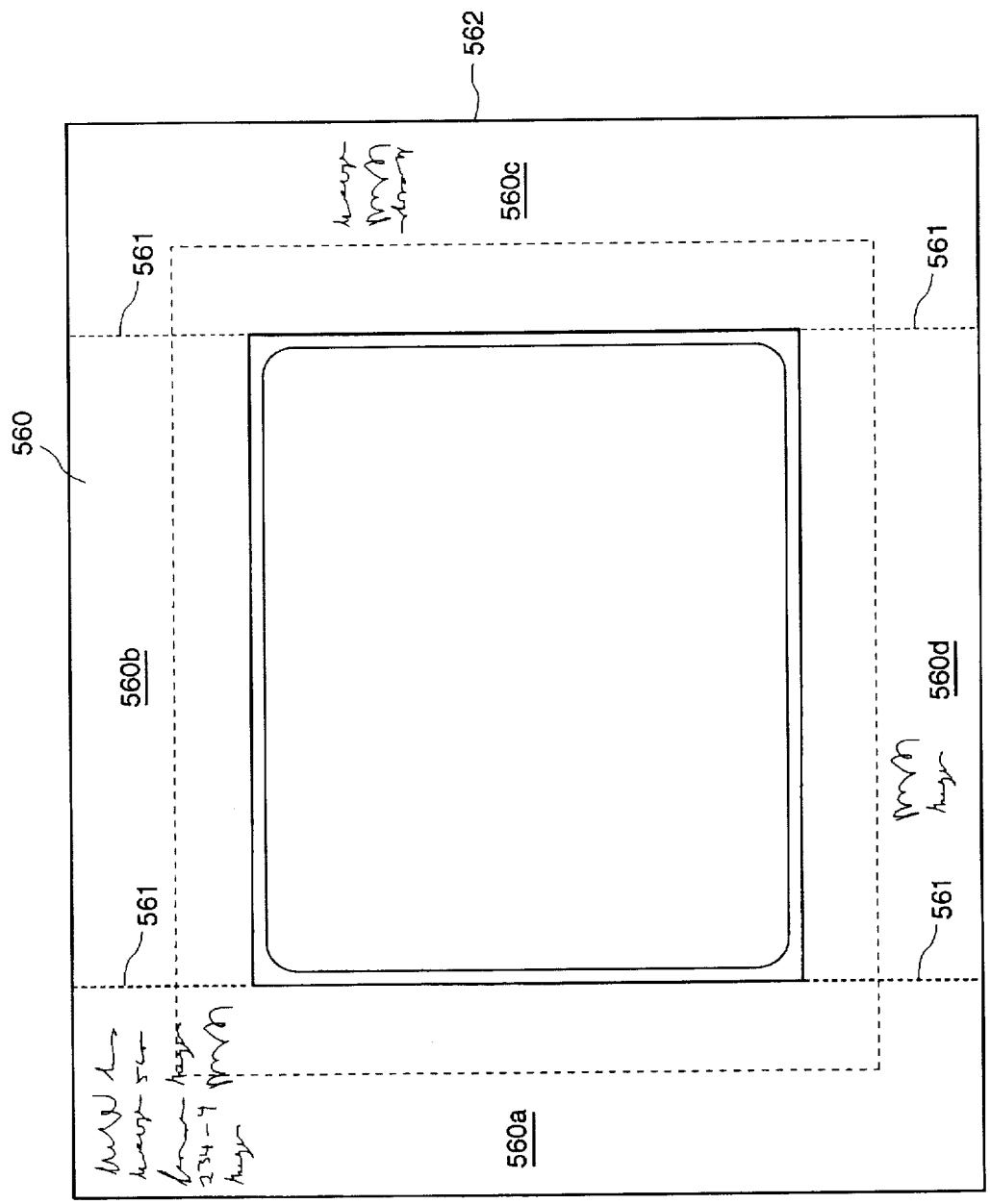
FIG. 5 is a front elevational view of another alternative embodiment of the computer video monitor mask of FIG. 1.

In another alternative embodiment of the first preferred embodiment, as illustrated in FIG. 5, it is contemplated that the sheets of paper 560 each have at least one row of aligned perforations 561 therein, so as to define readily tearable portions 560a, 560b, 560c, and 560d in the sheets of paper 560, thus permitting these readily tearable portions 560a, 560b, 560c, and 560d to be torn off, as desired, while leaving the remaining portion of the sheet of paper 560 on the pad of paper 562.

Figure 6:
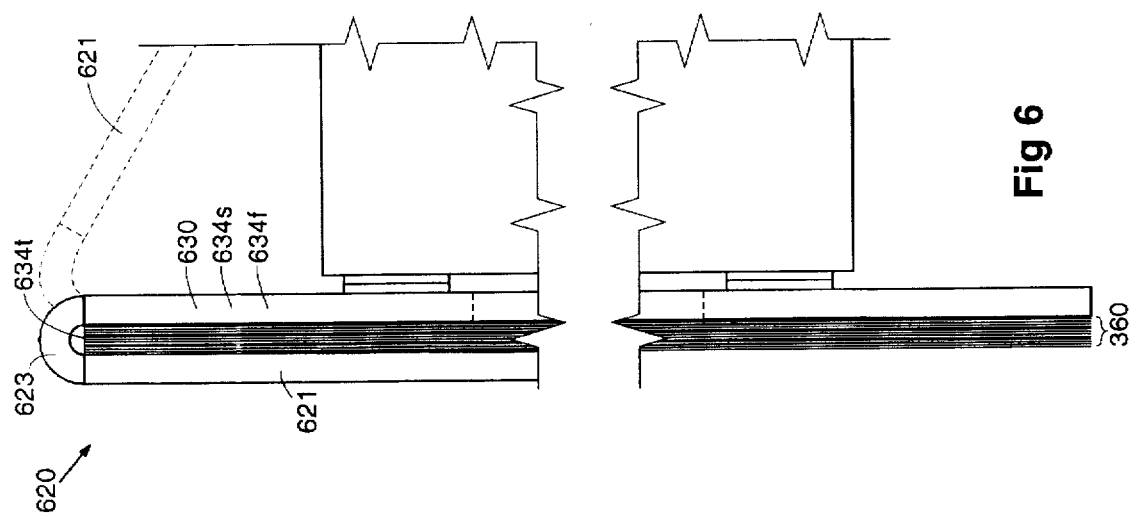
FIG. 6 is a side elevational view of yet another alternative embodiment of the computer video monitor mask of FIG. 1.

In a further alternative embodiment of the first preferred embodiment, as illustrated in FIG. 6, it is contemplated that the computer video monitor mask 620 of the present invention further comprises a protective front cover 621, made from either an opaque or transparent material, foldably secured to the top edge 634t of the panel portion 630 by means of a cloth hinge 623 or the like, for movement between a first position, as shown in solid lining, whereat the front cover 621 is disposed in overlying relation to the sheets of paper, and a second position, as shown in ghost outline, whereat the front cover 621 is removed from the aforesaid overlying relation. It is also contemplated that the front cover could be foldably secured to either one of the first and second opposed side edges 634f, 634s, of the panel portion 630.

Figure 8:
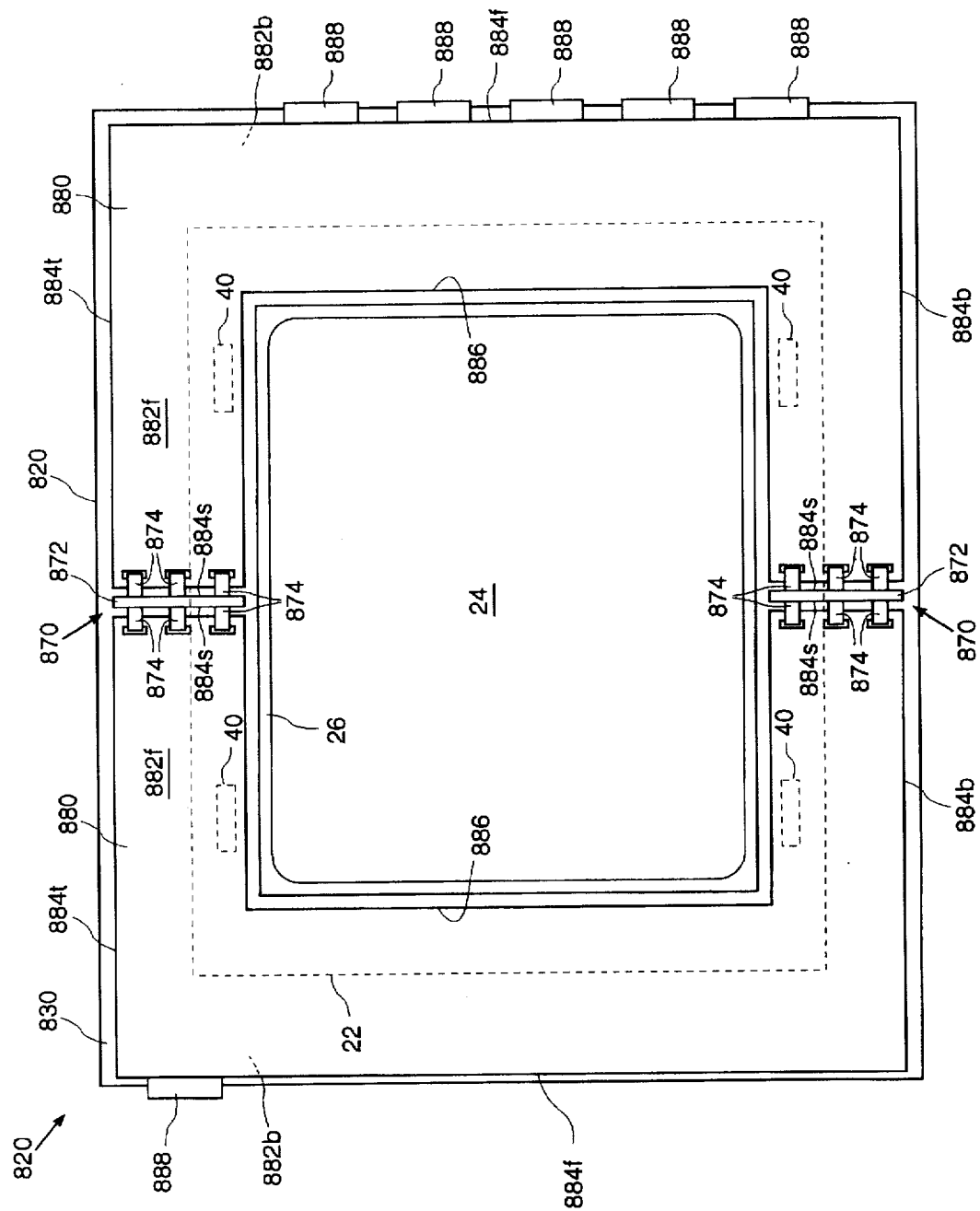
FIG. 8 is a front elevational view of a second preferred embodiment of the computer video monitor mask of the present invention in place on a computer video monitor.

In a second preferred embodiment, as illustrated in FIG. 8, it is contemplated that the computer video monitor mask 820 of the present invention has, in addition to or in place of the pad of paper 62, a plurality of page elements 880. Each of the plurality of page elements 880 has a front surface 882f and an opposed back surface 882b. Each of the front surface 882f and the back surface 882b of each of the plurality of page elements 880 displays information and also may be suitable for writing on.

Further, each of the plurality of page elements 880 has a top edge 884t, a bottom edge 884b, a first side edge 884f, and a second side edge 884s, which four edges, 884t, 884b, 884f, 884s essentially define the overall shape of each page element 880. Each of the page elements 880 also has a cut-away portion 886 therein, and is shaped and dimensioned to at least partially surround the computer video monitor screen 24, yet still permit viewing therethrough. The page elements 880 may also partially block portions of the computer video monitor screen 24, if desired, such as to draw attention to portions of the screen 24 or to block portions of the screen 24, possibly for instructional purposes. The cut-away portions 886 are shaped and dimensioned to permit viewing of the computer video monitor screen 24 therethrough, when the computer video monitor mask 820 is in place on the computer video monitor 22, and when the page elements 880 are in either of the front surface display position or the back surface display position.

Each of the plurality of page elements 880 is operatively connected to the back panel 830 by a binding means 870. In the preferred embodiment, the binding means 870 comprises an elongate spine 872 having a plurality of semi-circular ring portions 874 extending outwardly therefrom. The elongate spine 872 of the binding means 870 is securely attached to the back panel 830 by any suitable fastening means such as rivets, adhesive, and so on. The plurality of page elements 880 is operatively retained by the semi-circular ring portions 874.

Each of the plurality of page elements is operatively connected to the back panel element 830 for movement individually between a front surface display position and a back surface display position. In the front surface display position, the front surface 882f of the page elements 880 face outwardly so as to be visible from in front of the computer video monitor screen 24. In the back surface display position, the back surface 882b of the page elements 880 face outwardly so as to be visible from in front of the computer video monitor screen 24. Tabs 888 may be used to facilitate turning of the page elements 880 and for indexing purposes. As can be seen in FIG. 8, it is common to have the page elements 880 positioned such that one is in a front surface display position and an adjacent one is in a back surface display position, thus displaying information over nearly the entire area of the back panel 830.

Figure 9:
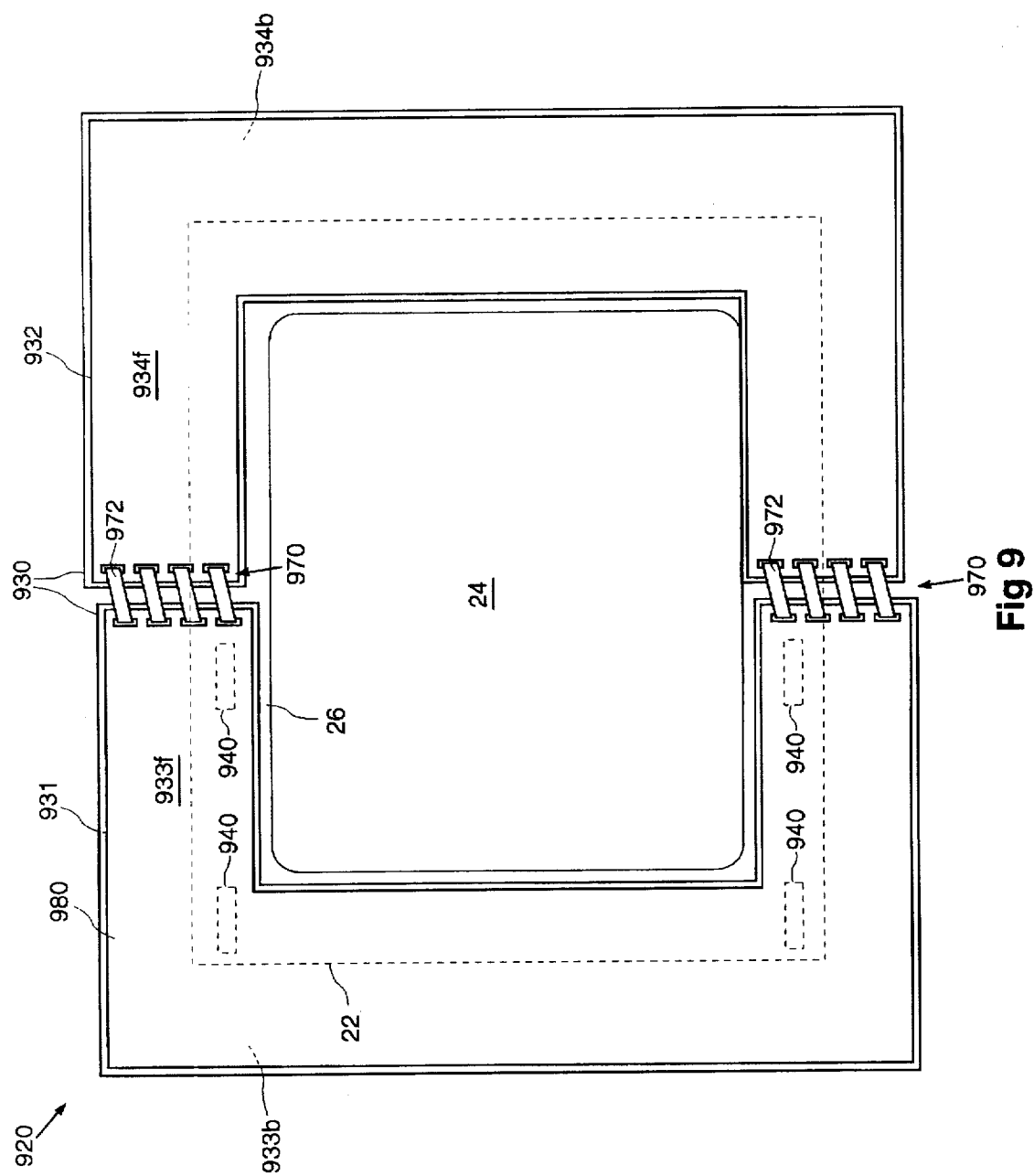
FIG. 9 is a front elevational view of an alternative embodiment of the computer video monitor mask of FIG. 8.

In an alternative embodiment of the second preferred embodiment, as shown in FIG. 9, an alternative embodiment back panel 930 comprises a first back panel element 931 and a second back panel element 932 operatively joined one to another by binding means 970, which binding means 970 also operatively connects the plurality of page elements 980 to the back panel 930. In this alternative embodiment, the binding means comprises a spiral ring member 972 extending through co-operating apertures in the page elements 980, the second back panel element 932, and the first back panel element 931. The spiral ring member 972 is thereby securely attached to the first back panel element 931.

The first back panel element 931 has a front surface 933f and a back surface 933b, and the second back panel element 932 has a front surface 934f and a back surface 934b. Each of the first back panel element 931 and the second back panel element 932 is shaped and dimensioned to at least partially surround the computer video monitor screen 24, when the computer video monitor mask 920 is in place on the computer video monitor 22, and when the page elements 980 are in either of the front surface display position or the back surface display position. It can be seen that each of the first back panel element 931, the second back panel element 932, and each of the page elements 980 is substantially "C"-shaped.

The attachment means 940 is disposed on the back surface of the first back panel element 931.

The second back panel element 932 is moveable with respect to the first back panel element 931 between a front surface display position and a back surface display position. In the front surface display position, the front surface 934f of the second back panel element 932 faces outwardly so as to be visible from in front of the computer video monitor screen 24. In the back surface display position, the back surface 934f of the second back panel element 932 faces outwardly so as to be visible from in front of the computer video monitor screen 24.

Other modifications and alterations may be used in the design and manufacture of the apparatus of the present invention without departing from the spirit and scope of the accompanying claims.

What is claimed is:

1. A computer video monitor mask for removable attachment to a computer video monitor having a computer video monitor screen and a front face, said computer video monitor mask generally surrounding said computer video monitor screen, and comprising:

a generally planar substantially rigid back panel having a generally planar front surface, a back surface, a top edge, a bottom edge, first and second opposed side edges, and a first generally centrally disposed cut-away portion therein;

attachment means disposed on said back surface of said generally planar substantially rigid back panel, to attach said computer video monitor mask to said computer video monitor;

wherein said back panel is shaped and dimensioned to at least partially surround said computer video monitor screen, and wherein said cut-away portion of said back panel is shaped and dimensioned to permit viewing of said computer video monitor screen therethrough, when said computer video monitor mask is in place on said computer video monitor;

a binding means securely attached to said back panel; and a plurality of page elements each having a front surface, a back surface, a top edge, a bottom edge, a first side edge, a second side edge, and a cut-away portion therein, and being operatively connected to said back panel by said binding means, for movement of each page element individually between a front surface display position whereat said front surface of said page element faces outwardly so as to be visible from in front of said computer video monitor screen, and a back surface display position whereat said back surface of said page element faces outwardly so as to be visible from in front of said computer video monitor screen;

wherein said plurality of page elements are each shaped and dimensioned to at least partially surround said computer video monitor screen, and wherein said cut-away portions of each of said plurality of page elements are shaped and dimensioned to permit viewing of said computer video monitor screen therethrough, when said computer video monitor mask is in place on said computer video monitor, and when said page elements are in either of said front surface display position or said back surface display position.

2. The computer video monitor mask of claim 1, wherein said back panel comprises first and second back panel elements operatively joined together one to the other, and each having a front surface and a back surface, wherein said attachment means is disposed on the back surface of said first panel element, and wherein said second back panel element is moveable with respect to said first back panel element between a front surface display position whereat said front surface of said second back panel element faces outwardly so as to be visible from in front of said computer video monitor screen, and a back surface display position whereat said back surface of said second back panel element faces outwardly so as to be visible from in front of said computer video monitor screen.

3. The computer video monitor mask of claim 2, wherein each of said first and second back panel elements is shaped and dimensioned to at least partially surround said computer video monitor screen, when said computer video monitor mask is in place on said computer video monitor.

4. The computer video monitor mask of claim 3, wherein said first and second back panel elements are joined together one to the other by said binding means.

5. The computer video monitor mask of claim 1, wherein said attachment means is disposed on said back surface of said first panel element.

6. The computer video monitor mask of claim 1, wherein said binding means comprises a spiral ring member.

7. The computer video monitor mask of claim 1, wherein said binding means comprises an elongate spine having a plurality of semi-circular ring portions extending outwardly therefrom.

8. The computer video monitor mask of claim 1, wherein said first back panel element, said second back panel element, and each of said page elements are substantially "C"-shaped.

* * * * *